United States Patent [19]
Hanser et al.

[11] 3,791,457
[45] Feb. 12, 1974

[54] UNIVERSAL CONNECTION FOR BLADE-SUPPORTING DRAFT FRAME OF A MOTOR GRADER

[75] Inventors: Paul Edmund Hanser, Moline, Ill.; Thomas Edward Gebauer, Dubuque, Iowa

[73] Assignee: Deere & Company, Moline, Ill.

[22] Filed: Dec. 1, 1972

[21] Appl. No.: 311,156

[52] U.S. Cl. .............................. 172/781, 403/125
[51] Int. Cl. .............................................. E02f 3/12
[58] Field of Search ........... 172/781, 789, 793, 795; 403/125, 143, 122; 280/511, 512

[56] References Cited
UNITED STATES PATENTS
3,165,942  1/1965  Steiner et al. ............... 403/143 X
2,195,607  4/1940  Wilson et al. ............... 172/793

*Primary Examiner*—Stephen C. Pellegrino

[57] ABSTRACT

A motor grader is provided with a wheel-supported main frame to which the forward end of a blade-supporting draft frame is universally connected by means of a ball and socket connection.

8 Claims, 3 Drawing Figures

UNIVERSAL CONNECTION FOR BLADE-SUPPORTING DRAFT FRAME OF A MOTOR GRADER

BACKGROUND OF THE INVENTION

The present invention relates to a ball and socket connector for connecting a blade-supporting draft frame of a motor grader to the main frame of the grader.

Motor grader draft frames normally are universally connected at their forward ends to the grader main frame for permitting the draft frames to be shifted from side-to-side about their forward connections and/or tilted and/or raised vertically about their forward connections.

Motor grader draft frame constructions are known wherein the forward ends of the draft frames are provided with universal connections of conventional ball and socket design wherein the ball is welded to the draft frame and the socket is fixed to the main frame and defines a rigid two-piece socket for retaining the ball. These constructions are not entirely satisfactory since the angular movement of the ball and hence the draft frame within the retainer socket is unduly limited by the neck or place of weldment of the ball to the draft frame coming into contact with the retainer socket. Experience has shown that the strength requirement of the neck of the ball is such that the angular movement of the draft frame from a normal trailing position to an extreme outwardly swung position is limited to about 20°–25°.

SUMMARY OF THE INVENTION

Accordingly, the present invention relates to an improved connector of the ball and socket type for connecting a motor grader draft frame to the main frame of the grader.

It is a primary object of the invention to provide a motor grader draft frame connector of the ball and socket type wherein the ball and socket cooperate together to permit the draft frame to move angularly a greater extent than would be possible if the ball and socket design were of conventional construction. Specifically, it is an object of the invention to provide a ball and socket design consisting of a standard ball which is welded to the grader draft frame and a retainer socket which is attached to the grader main frame, the retainer socket having an inner diameter which fits the draft frame ball and also having a larger outer diameter; and a retaining ring fixed annularly about the frame ball and the outer diameter of the retainer socket and having bearing portions in engagement with the frame ball and outer diameter of the retaining socket.

These and other objects will become apparent from a consideration of the following description and the appended drawing.

DESCRIPTION OF THE PREFERRED EMBODIMENT

Figure 1:
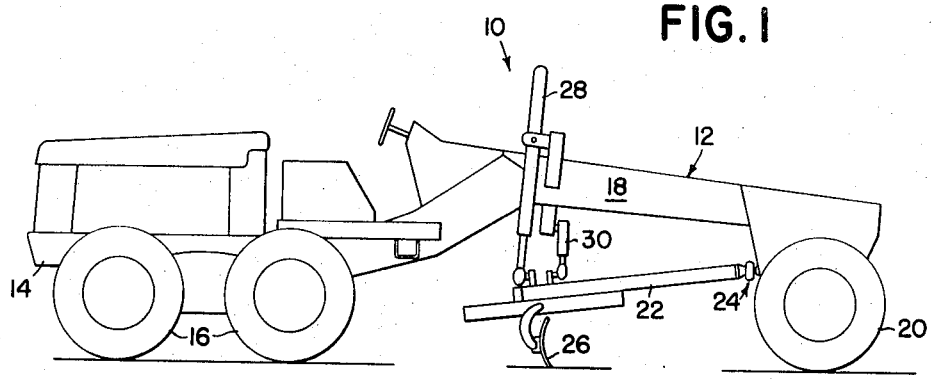
FIG. 1 is a side view of a motor grader of the type embodying the present invention.

Referring now to FIG. 1, therein is shown a motor grader indicated in its entirety by the reference numeral 10. The grader 10 comprises a fore-and-aft extending main frame 12 including a horizontal rear portion 14 supported by two pairs of rear wheels 16 (only one of each pair being shown) and a forward elevated frame portion 18 supported on a pair of front wheels 20 (only one being shown). Located beneath the forward frame portion 18 is a draft frame 22 having its forward end connected to the forward frame portion 18 in the vicinity of the front wheels 20 by means of a ball and socket connection 24. Fixed to the rear portion of the draft frame 22 is a blade 26. Extending between the main frame 12 and the rear portion of the draft frame 22 are a first pair of hydraulic actuators 28 (only one being shown) which are respectively extensible and retractable for tilting and raising and lowering the draft frame about the ball and socket connection 24. Also extending between the main frame 12 and the draft frame 22 is a side shift cylinder 30 which, as the name implies, acts to shift the draft frame to one side or the other of a normally centered position located below the forward frame portion 18.

The connection 24 comprises a ball 32 fixed as by welding to the forward corner of the draft frame 22 and defining a neck 34 at the juncture therewith, the neck having a diameter d. The connection 24 further includes a retainer socket 36 fixed to the forward main frame portion 18, the socket 36 having inner and outer spherical surfaces 38 and 40, respectively. It is here noted that the ball 32 could just as well be fixed to the main frame with the retainer socket 36 then being fixed to the draft frame.

In any event, the outer surface 40 forms a neck 42 with the front frame portion 18 at the connection of the retainer socket with the frame. The inner surface 38 of the retainer socket bearingly receives the ball 32 and the ball 32 is retained therein by means of a retainer ring 44 including a first annular part 46 having an annular spherical surface portion 48 in bearing engagement with the outer surface 40 of the retainer socket and including a second annular part 50 having an annular spherical surface portion 52 in bearing engagement with the ball 32. The first and second parts 46 and 50 are fixed together through means of a plurality of screws 54 (only one being shown).

Figure 3:
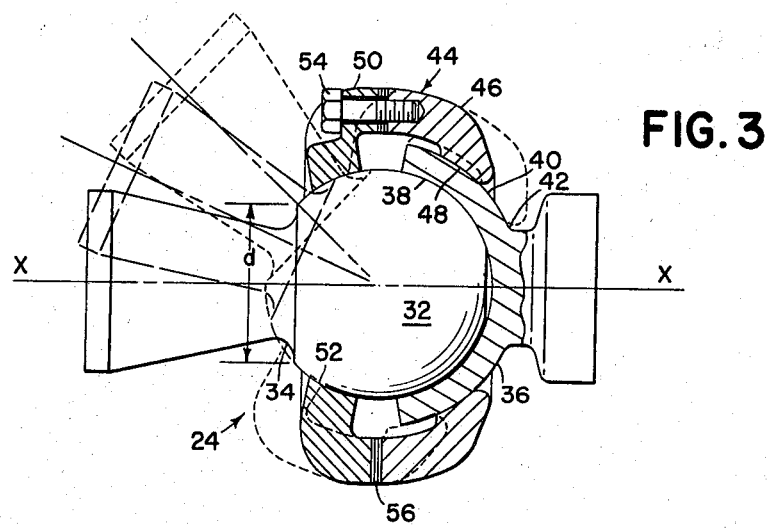
FIG. 3 is a longitudinal sectional view of the ball and socket connector and showing an extreme angular position of the retaining ring and ball in dashed lines while showing the ball in broken lines in an extreme position which it would be able to attain if the ball and socket connector were of conventional design.

It is here noted that the socket 36 is only large enough to seat less than half of the surface area of the ball 32 while the axial extent of the retainer ring 44, with respect to a given axis such as X—X shown in FIG. 3, is approximately three-fourths of the axial extent of the ball 32 relative to that axis. Thus, when the parts are symmetrically arranged with respect to an axis such as X—X in FIG. 1, the surfaces 48 and 52 respectively engage the outer surface of the socket 36 and the ball 32 at locations on opposite sides of a plane passing through the center of the ball and extending perpendicular to the axis X—X. It follows then from the foregoing construction that the retainer ring 44 acts to keep the ball 32 in bearing engagement with the inner surface of the socket 36.

To maintain the proper seating of the retainer ring on the ball 32 and the socket surface 40, a plurality of annular shims 56 are provided at the juncture of the first and second retainer ring parts 46 and 52 respectively.

Figure 2:
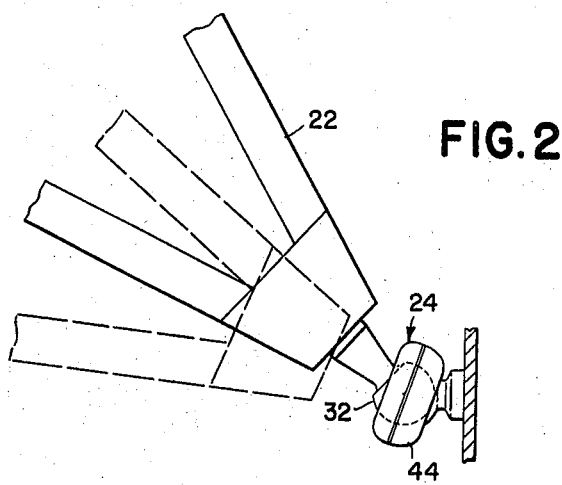
FIG. 2 is a top plan view showing the connection of the draft frame to the main frame, the draft frame being shown in dashed lines in the angular position to which it would be limited if the ball and socket connector were of conventional design.

In operation, assuming that the draft frame is in a position centered rearwardly beneath the main frame 12, the ball 32, retainer socket 36 and retainer ring 44 will be in the solid line position shown in FIG. 3 wherein they are symmetrical about the axis X—X. If it is then desired to move the draft frame 22 to one side as might be desired for grading a shoulder of a road for example, the hydraulic actuator 30 is appropriately actuated for shifting the draft frame. This sideways shifting may continue until the draft frame is positioned in the maximum sideways position as shown in solid lines in FIG. 2 and dashed lines in FIG. 3 respectively. When in this maximum position, it is noted that the retainer ring 44 will be moved clockwise from its solid line position in FIG. 3 to the dashed line position.

It can be appreciated that if the retainer ring formed an integral rigid part of the retainer socket 36, a conventional ball and socket design would be present and the sideways movement of the draft frame would be limited to that position whereat the neck 34 of the ball 32 would come into engagement with the retainer ring 44 if it were immovable. This position is shown in broken lines in FIGS. 2 and 3.

It is clearly apparent then that with the dimensions as disclosed, the draft frame will be permitted to swing approximately 20° farther about its forward connection than would be possible with a conventional ball and socket connector. Since the blade 26 is secured at a rearward portion on the draft frame 22, it will be appreciated that the added sideways shifting distance due to the additional 20° of pivot permitted by the improved ball and socket design will be appreciable.

We claim:

1. In a motor grader of the type including a wheel-supported main frame and a blade-supporting draft frame universally con-nected at one point to the main frame, an improved universal con-nection comprising: a substantially spherical ball segment being formed integrally with one of said main and draft frames and being received in a complementary bearing seat formed integrally with the other of said main and draft frames; said spherical ball segment being larger than a hemisphere and said seat defining a bearing area less than that required to bear against a hemisphere portion of said ball segment; a second spherical bearing seat being formed integrally on said other of said main and draft frames in parallelism to said complementary bearing seat; an annular retaining ring for maintaining said ball segment seated in said complementary seat including a first annular clamping surface slidably engaging said spherical ball segment and a second annular clamping surface slidably engaging said second spherical bearing seat; and said first and second annular clamping surfaces being spaced from each other on opposite sides of a plane passing through the center of said spherical ball segment and being perpendicular to an axis extending centrally relative to the annular ring.

2. The motor grader defined in claim 1 wherein said retaining ring includes first and second releasably interconnected sections respectively having said first and second annular clamping surfaces formed thereon.

3. The motor grader defined in claim 2 wherein said retaining ring is separated into said first and second sections along a plane extending perpendicular to the central axis of the retaining ring; and a plurality of annular shims being removably mounted at the separation of the two sections whereby the retaining ring may be adjusted to compensate for the wear of the various components making up the universal connection.

4. The motor grader defined in claim 1 wherein the ball segment is fixed to the draft frame.

5. In a motor grader of the type including a wheel-supported main frame and a blade-supporting draft frame universally supported by the main frame, an improved universal connection comprising: a spherical ball segment forming more than half of a ball and being formed integrally with a first neck member defining a circle, at the intersection of the ball segment and neck member, which is concentric to a diameter of said ball; a shell-like spherical ball segment forming less than half of a hollow spherical ball and having an inner bearing surface shaped complementary to and receiving a portion of said first-named ball segment, and having an outer bearing surface extending parallel to the inner surface; a second neck member being formed integrally with and defining a circle at its intersection with said outer bearing surface; a retaining ring extending between and bearing disposed annularly about said ball segments; said retaining ring having a first annular spherical surface slidably engaged with the first-named ball segment, and a second annular spherical surface slidably engaged with the hollow spherical ball segment; and said first neck member forming an integral part of one of said main and draft frames, and said second neck member forming an integral part of the other of said main and draft frames.

6. The motor grader defined in claim 5 wherein said retaining ring includes first and second releasably interconnected sections respectively having said first and second annular spherical surfaces formed thereon.

7. The motor grader defined in claim 6 wherein said retaining ring is separated into said first and second sections along a plane extending perpencidular to the central axis of the retaining ring; and a plurality of shims being removably mounted at the separation of the two sections whereby the retaining ring may be adjusted to compensate for the wear of the various components making up the universal connection.

8. The motor grader defined in claim 5 wherein the first-named ball segment is fixed to the draft frame.

* * * * *